United States Patent
Buse et al.

(10) Patent No.: US 9,886,053 B1
(45) Date of Patent: Feb. 6, 2018

(54) ELECTRONIC VEHICLE PEDAL ACTIVATION SYSTEM

(71) Applicants: Timothy Buse, Fridley, MN (US); James F. Buse, Woodstock, MN (US)

(72) Inventors: Timothy Buse, Fridley, MN (US); James F. Buse, Woodstock, MN (US)

( * ) Notice: Subject to any disclaimer, the term of this patent is extended or adjusted under 35 U.S.C. 154(b) by 0 days.

(21) Appl. No.: 15/341,247

(22) Filed: Nov. 2, 2016

(51) Int. Cl.
*F16H 3/06* (2006.01)
*G05G 1/54* (2008.04)
*F16H 25/20* (2006.01)
*G05G 1/44* (2008.04)

(52) U.S. Cl.
CPC ........... *G05G 1/54* (2013.01); *F16H 25/2015* (2013.01); *F16H 2025/2037* (2013.01); *G05G 1/44* (2013.01)

(58) Field of Classification Search
CPC ........ G05G 1/54; G05G 1/44; F16H 25/2015; F16H 2025/2037
See application file for complete search history.

(56) References Cited

U.S. PATENT DOCUMENTS

| | | | | |
|---|---|---|---|---|
| 3,643,524 A * | 2/1972 | Herring | ................... | G05G 1/405 74/512 |
| 3,643,525 A * | 2/1972 | Gibas | ....................... | G05G 1/30 74/512 |
| 5,697,260 A * | 12/1997 | Rixon | ................... | B60K 26/021 74/513 |
| 5,713,189 A * | 2/1998 | Toman | ..................... | B60L 7/006 180/170 |
| 5,722,302 A * | 3/1998 | Rixon | ................... | B60K 26/021 74/512 |
| 5,887,488 A * | 3/1999 | Riggle | ................... | B60K 26/02 123/399 |
| 5,927,154 A * | 7/1999 | Elton | ..................... | G05G 1/405 74/512 |
| 5,996,438 A * | 12/1999 | Elton | ........................ | G05G 1/40 74/512 |
| 6,019,015 A * | 2/2000 | Elton | ..................... | G05G 1/405 74/512 |
| 6,247,381 B1 * | 6/2001 | Toelke | ................... | G05G 1/405 74/512 |
| 6,263,859 B1 * | 7/2001 | Kalsi | ........................ | G05G 1/30 123/399 |
| 6,523,433 B1 * | 2/2003 | Staker | ....................... | G05G 1/30 74/513 |
| 6,810,765 B2 * | 11/2004 | Zhang | .................... | G05G 1/405 74/512 |
| 7,270,028 B2 * | 9/2007 | Rixon | ....................... | G05G 1/36 74/512 |
| 7,516,822 B2 * | 4/2009 | Kramer | ................... | B60T 7/107 188/156 |

(Continued)

*Primary Examiner* — Zakaria Elahmadi
(74) *Attorney, Agent, or Firm* — Dave Alan Lingbeck

(57) ABSTRACT

An electronic vehicle pedal activation system for eliminating the need to have more than one person when working on vehicle where using a pedal of the vehicle is required. The electronic vehicle pedal activation system includes a support assembly including a shaft having a length and adapted to be removable and in contactable relationship with a floor board; a pedal activation assembly in communication with the support assembly for moving a pedal of a vehicle; and a control assembly in operable communication with the pedal activation assembly.

10 Claims, 5 Drawing Sheets

(56) References Cited

U.S. PATENT DOCUMENTS

| | | | | |
|---|---|---|---|---|
| 2001/0056544 | A1* | 12/2001 | Walker | B60R 25/02 |
| | | | | 726/2 |
| 2007/0114836 | A1* | 5/2007 | Kaminski | B60T 7/06 |
| | | | | 303/7 |
| 2008/0257656 | A1* | 10/2008 | Skinner | B60T 7/20 |
| | | | | 188/1.11 E |
| 2010/0122599 | A1* | 5/2010 | Kazanchy | G05G 1/54 |
| | | | | 74/471 R |
| 2014/0298949 | A1* | 10/2014 | Brown | G05G 1/40 |
| | | | | 74/513 |

* cited by examiner

ELECTRONIC VEHICLE PEDAL ACTIVATION SYSTEM

BACKGROUND OF THE INVENTION

Field of the Invention

The present invention relates to vehicle pedal actuator and more particularly pertains to a new electronic vehicle pedal activation system for eliminating the need to have more than one person when working on a vehicle where using a vehicle pedal is required.

Description of the Prior Art

The prior art includes a pneumatic linear actuator (commonly termed an air cylinder) that is pneumatically connected to a foot, hand or electronically activated pneumatic valve and a pneumatic power source. One end of the actuator is attached to a vehicle steering wheel with the opposite end attached to the vehicle accelerator, clutch or brake pedal. Activating, the pneumatic valve pressurizes the actuator causing the actuator rod arm to extend and depress the vehicle pedal. Another prior art includes an elongated tube having, an elongated rod telescopically received within it so that the rod is movable between an extended and a retracted position. A compression spring is compressed between the rod and tube and resiliently urges the rod toward its extended position. Also, another prior art includes a first tube, and a second tube concentric and slidable in the first tube; the first tube having brake pedal engaging means; the second tube having steering wheel engaging means; the device having spring actuated button means for extending and locking the tubes together in selected positions. The use of vehicle pedal actuator is known in the prior art. More specifically, vehicle pedal actuator heretofore devised and utilized are known to consist basically of familiar, expected and obvious structural configurations, notwithstanding the myriad of designs encompassed by the crowded prior art which have been developed for the fulfillment of countless objectives and requirements.

While these devices fulfill their respective, particular objectives and requirements, the aforementioned patents do not disclose a new electronic vehicle pedal activation system.

SUMMARY OF THE INVENTION

The general purpose of the present invention, which will be described subsequently in greater detail, is to provide a new electronic vehicle pedal activation system which has many of the advantages of the vehicle pedal actuator mentioned heretofore and many novel features that result in a new electronic vehicle pedal activation system which is not anticipated, rendered obvious, suggested, or even implied by any of the prior art vehicle pedal actuator, either alone or in any combination thereof. The present invention includes a support assembly including a shaft having a length and adapted to be removable and in contactable relationship with a floor board; a pedal activation assembly in communication with the support assembly for moving a pedal of a vehicle; and a control assembly in operable communication with the pedal activation assembly. None of the prior art includes the combination of the elements of the present invention.

There has thus been outlined, rather broadly, the more important features of the electronic vehicle pedal activation system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new electronic vehicle pedal activation system which has many of the advantages of the vehicle pedal actuator mentioned heretofore and many novel features that result in a new electronic vehicle pedal activation system which is not anticipated, rendered obvious, suggested, or even implied by any of the prior art vehicle pedal actuator, either alone or in any combination thereof.

Still another object of the present invention is to provide a new electronic vehicle pedal activation system for eliminating the need to have more than one person when working on a vehicle where using a vehicle pedal is required.

Still yet another object of the present invention is to provide a new electronic vehicle pedal activation system that depresses, pulls back and releases the vehicle pedal as desired when working on the brakes and clutch.

Even still another object of the present invention is to provide a new electronic vehicle pedal activation system that can be easily and quickly set up inside the passenger compartment and can be controlled remotely and the amount the pedal is either depressed, retracted or released is controlled and gradual.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
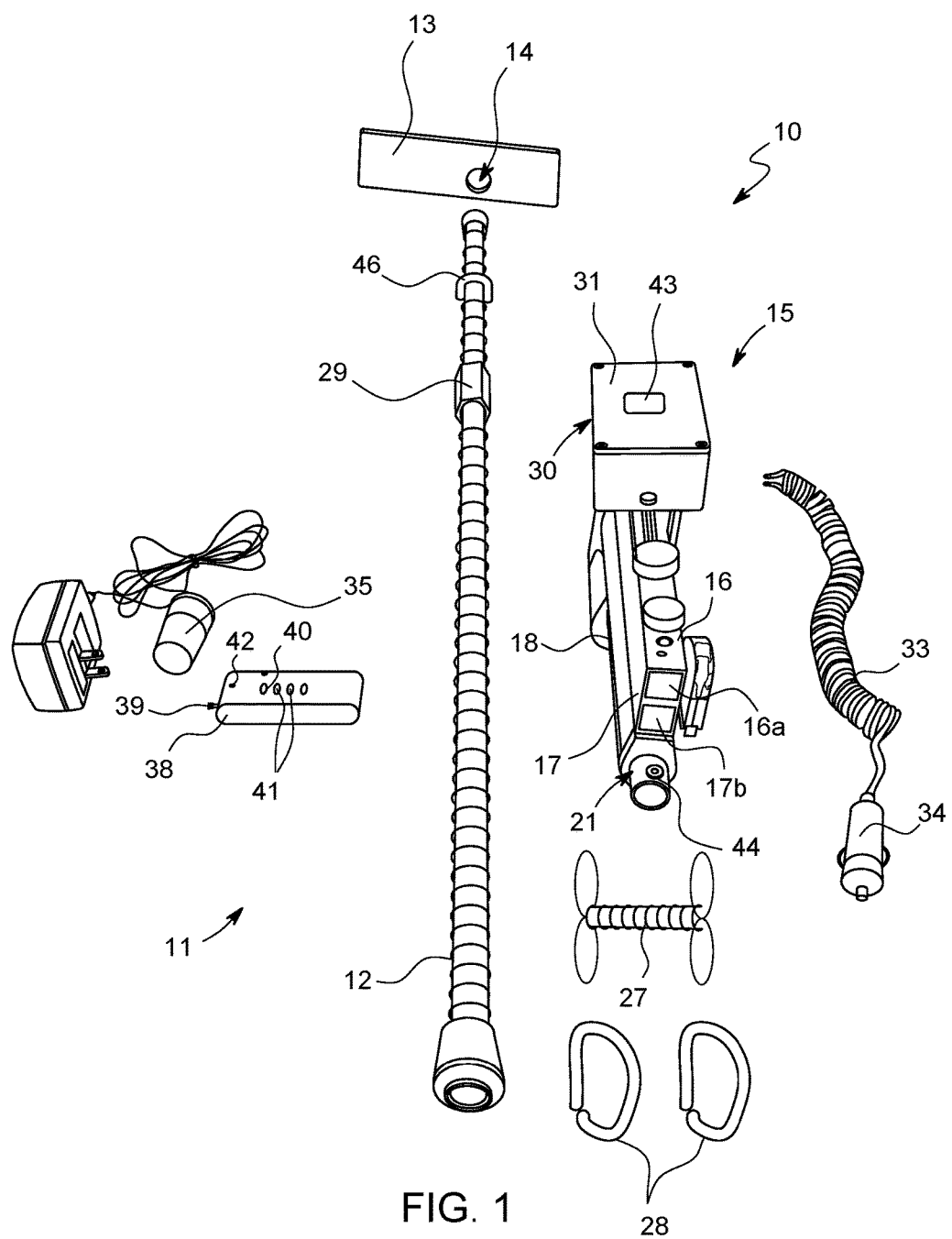
FIG. 1 is an exploded perspective view of a new electronic vehicle pedal activation system according to the present invention.
Figure 2:
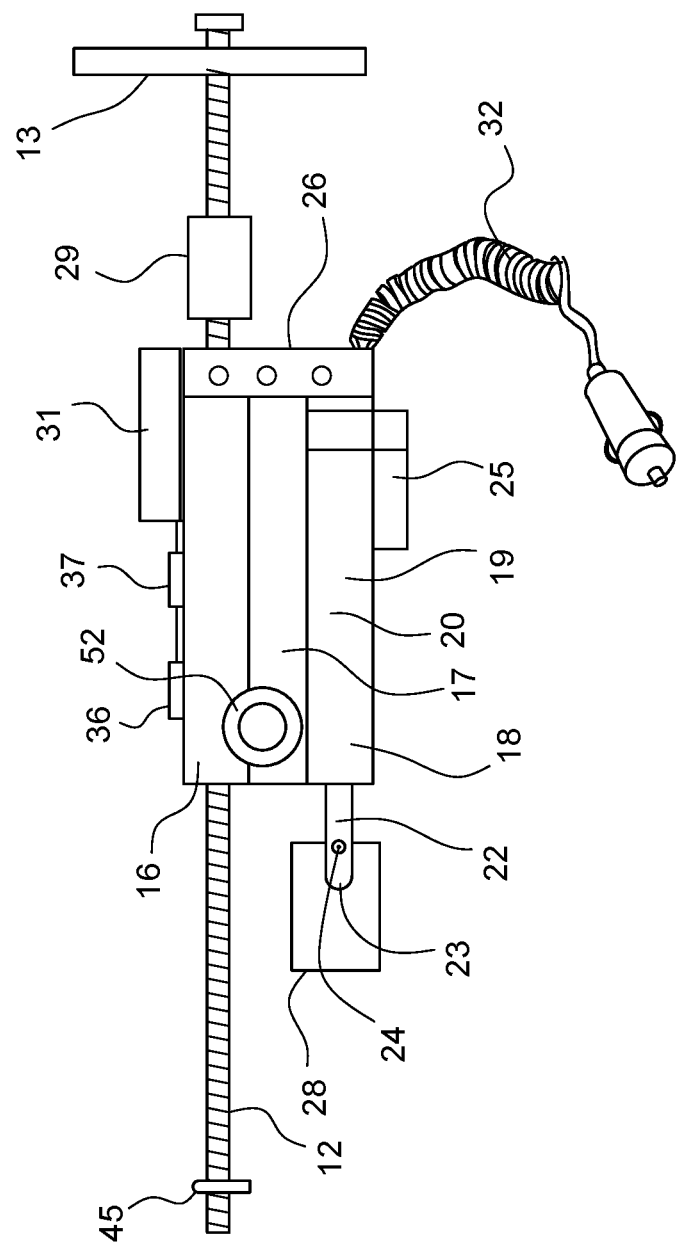
FIG. 2 is a side elevational view of the present invention.
Figure 3:
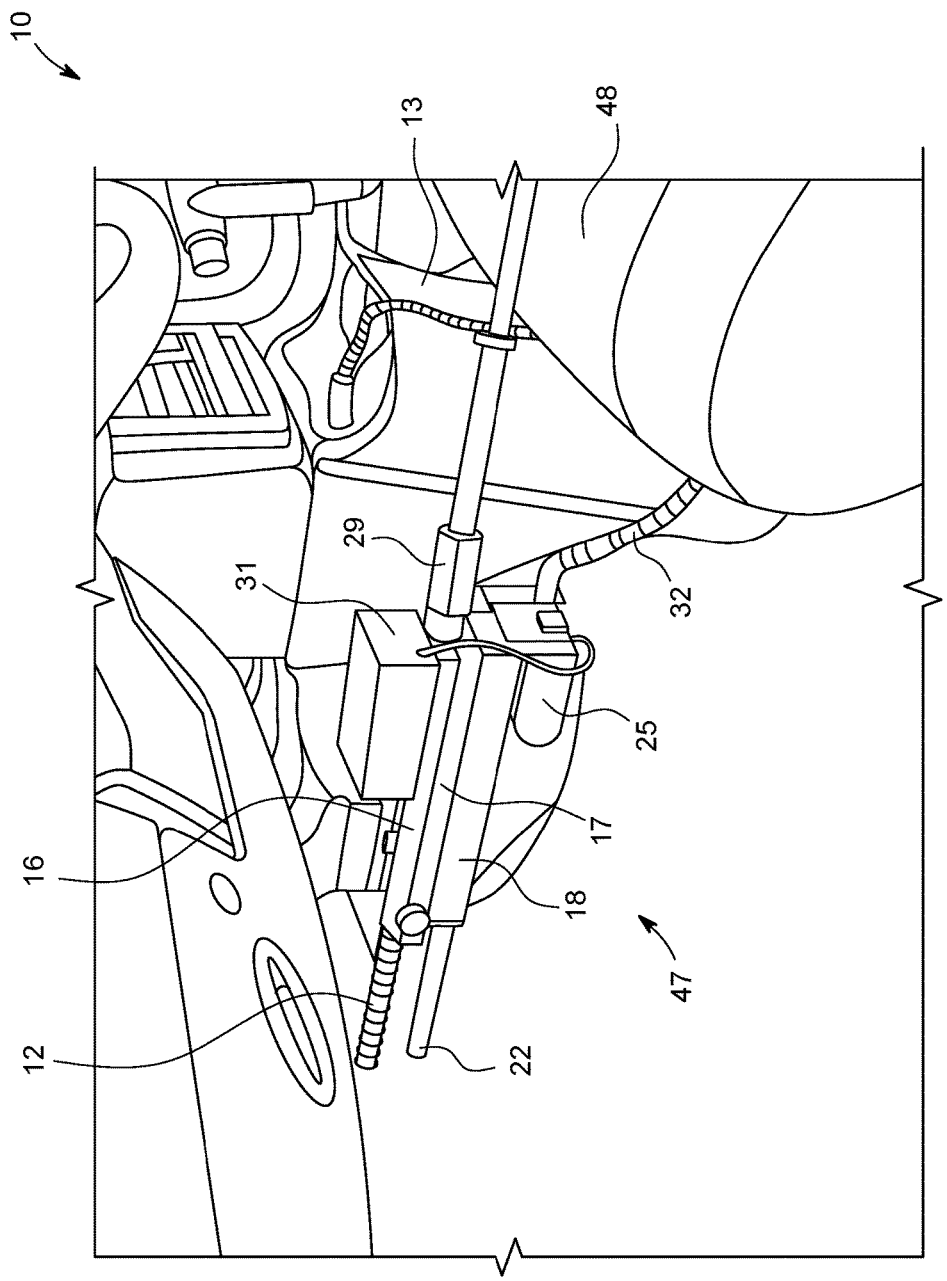
FIG. 3 is a perspective view of the present invention inside a passenger compartment of a vehicle and set up for use with the piston extended and depressing the pedal of the vehicle.
Figure 4:
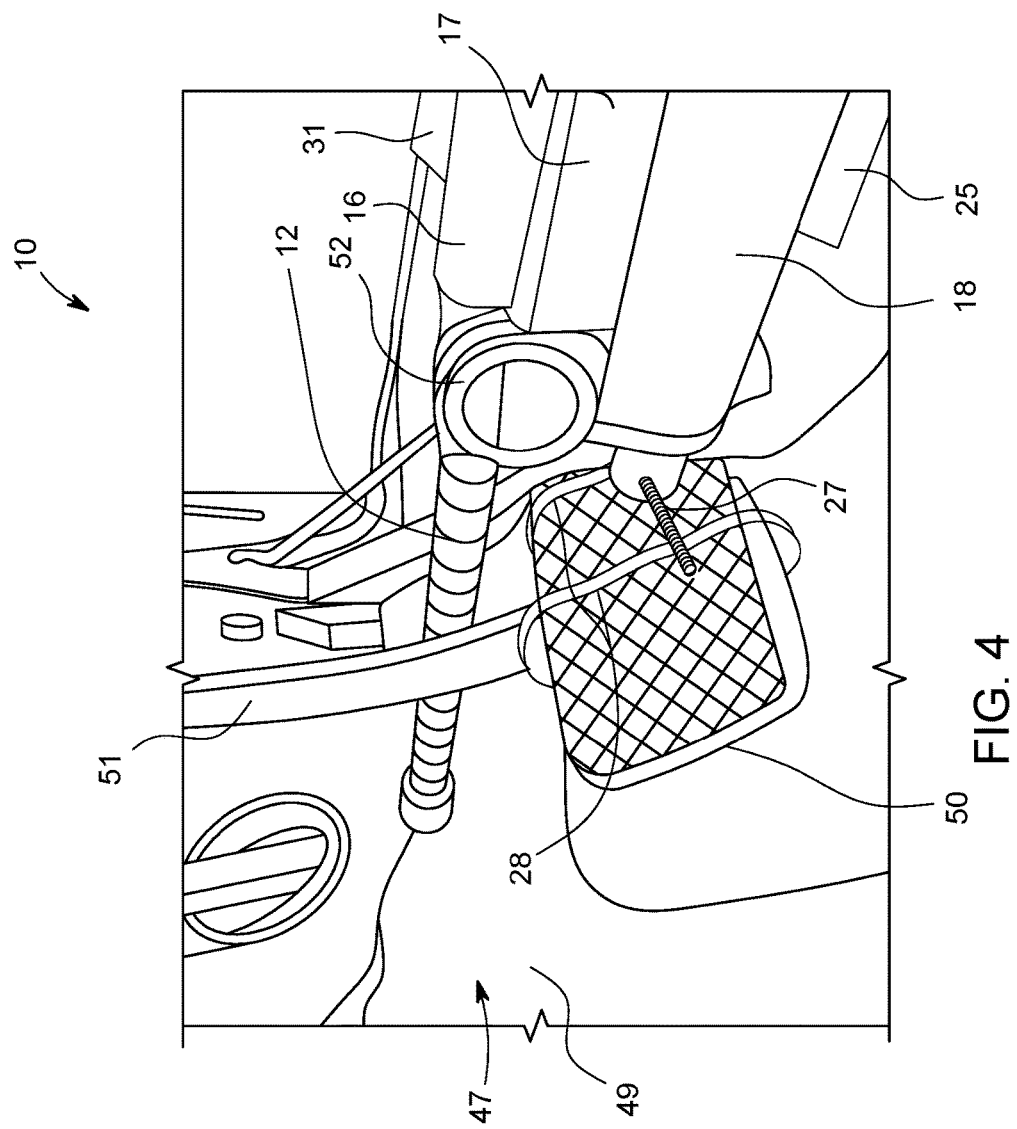
FIG. 4 is a perspective view of the present invention with the at least one fastening member secured to the anchor member and about and retracting the pedal of the vehicle.
Figure 5:
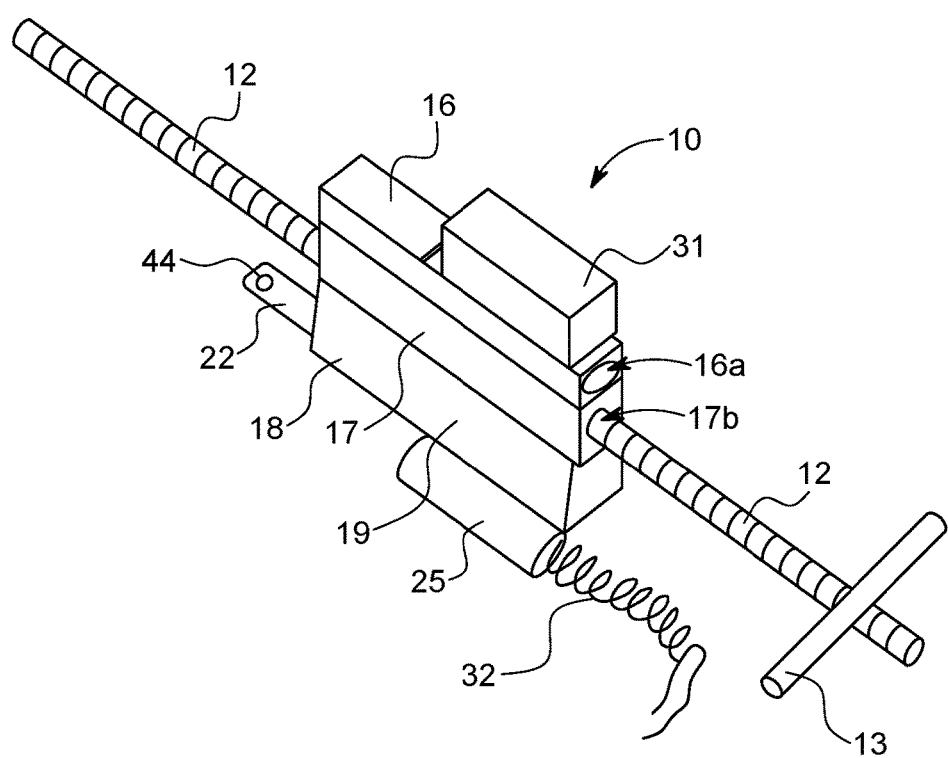
FIG. 5 is a perspective view of the present invention.

With reference now to the drawings, and in particular to FIGS. 1 through 5 thereof, a new electronic vehicle pedal activation system embodying the principles and concepts of the present invention and generally designated by the reference numeral 10 will be described.

As best illustrated in FIGS. 1 through 5, the electronic vehicle pedal activation system 10 may generally comprise a support assembly 10 including a shaft 12 having a length and adapted to be removable and in contactable relationship with a floor board 49 of a vehicle; and may also comprise a pedal activation assembly 15 in communication with the support assembly 11 for moving a pedal 50 of a vehicle; and may further comprise a control assembly 30 in operable communication with the pedal activation assembly 15. The support assembly 11 may also include a brace 13 conventionally movable and engagable upon and along the shaft 13 and adapted to engage the seat 48 of a vehicle to secure the shaft 12 inside a passenger compartment 47 of the vehicle. The brace 13 may be a rigid elongated plate having a hole 14 disposed laterally therethrough and through which the shaft 12 is movably extended. The shaft 12 may be externally threaded about and along at least a portion thereof.

As shown in FIGS. 1 through 5, the pedal activation assembly 15 may include at least one rigid support sleeve 16, 17 which is movably disposed upon, along and about the shaft 12, and may also include an electrical linear actuator 18 conventionally attached with a bracket 26 to the at least one support sleeve 16, 17, and may further include a motor 25 conventionally connected to the linear actuator 18 for the energizing thereof. The linear actuator 18 may include an elongated housing 19 having an open end 21 and a side wall 20 and also attached side-by-side with the bracket 26 to the at least one support sleeve 16, 17 with longitudinal axes of the elongated housing 19 and the at least one support sleeve 16, 17 being parallel to one another, and may also include a piston 22 conventionally disposed in and extendable from the housing 19 through the open end 21 using conventional mechanical parts including gears with the piston 22 being parallel to the shaft 12 and adapted to engage and depress the pedal 50 of the vehicle. The piston 22 may have a distal end 23 with a bore 24 laterally disposed through the piston 22 near the distal end 23. The pedal activation assembly 15 may further include an anchor member 27 removably disposed through the bore 24 of the piston 22. The anchor member 27 may be a bolt extending through the bore 24 and outwardly of the piston 22. The pedal activation assembly 15 may also include at least one fastening member 28 removably and conventionally secured to the anchor member 27 and adapted to removably secure about and pull the pedal 50 of the vehicle as the piston 22 is retracted into the housing 19 using the conventional mechanical parts including gears. The at least one fastening member 28 may be at least one strap removably disposed about the anchor member 27 and adapted to removably secure about the pedal 50 of the vehicle. The at least one support sleeve 16, 17 may include a first support sleeve 16 having a first passageway 16a extending longitudinally therethrough and a second support sleeve 17 conventionally attached and welded side-by-side to the first support sleeve 16 and having a second passageway 17b extending longitudinally therethrough with the elongated housing 19 also conventionally attached side-by side to the first support sleeve 16. The first support sleeve 16 may be sandwiched between the second support sleeve 17 and the elongated housing 19. The first and second support sleeves 16, 17 may be interchangeably and conventionally movably disposed about and along the shaft 12 to adapt to varying positions of the pedal 50 of the vehicle relative to a pedal support 51. The pedal activation assembly 15 may also a stopper 29 threaded about the shaft 12 and engagable with the at least one support sleeve 16, 17 to securely position the actuator 18 relative to the pedal 50 of the vehicle as desired.

As illustrated in FIGS. 1 through 5, the control assembly 30 may include a programmable processor 31 conventionally mounted to the pedal activation assembly 15 and in particular to the at least one support sleeve 16, 17 and being in conventional operable communication with the motor 25, and may also include a power transmitting member 32 in conventional operable communication with the processor 31 for energizing the motor 25. The power transmitting member 32 may include a power cord 33 with a cigarette lighter adapter 34 for connecting to a cigarette lighter in the vehicle and may also include a 120 volt power adapter 35 to connect to an electrical power outlet. The control assembly 30 may include a remote control unit 38 with a wireless transmitter 39, a power switch 40, a forward and reverse switch 41 to extend and retract the piston 22, and a light-emitting member 42 to indicate actuation of the linear actuator 18. The processor 31 may also include a receiver 43 in radio wave communication with the transmitter 39 of the remote control unit 38. The control assembly 30 may further include speakers 36, 37 conventionally mounted to the pedal activation assembly 15 in particular to the at least one support sleeve 16, 17 and conventionally connected to the processor 31 to emit selected distinct audible sounds depending upon whether the piston 22 is being extended or retracted. The control assembly 30 may also include a sensor 44 removably and conventionally disposed upon the piston 22 near the distal end 23 thereof and in conventionally communication with the processor 31 to detect and transmit motion and position of the piston 22 to the processor 31 whereupon the distinct audible sounds are emitted through the speakers 36, 37, and may further include at least one sensor activating member 45 removably and conventionally positioned upon the shaft 12 to which the sensor 44 senses and detects the position of the piston 22. The at least one sensor activating member 45 is a clip with a chip 46 removably clipped about and along the shaft 12 and to which the sensor 44 is capable of detecting. The control assembly 30 may further include a measurement instrument 52 such as a tape measure conventionally mounted to the pedal activation assembly 15 in particular to the at least one support sleeve 16, 17 for measuring positioning of the linear actuator 18 relative to the pedal 50 of the vehicle.

In use, the shaft 12 may be inserted through the at least one of the support sleeves 16, 17 and the shaft 12 may be securely positioned in the passenger compartment 47 with an end of the shaft 12 positioned against the floor board 49 of the vehicle and the brace 13 secured against the seat 48 of the vehicle with the shaft positioned near the pedal 50 of the vehicle so that the actuator 18 may be linearly aligned with the pedal 50 of the vehicle so that the piston 22 when extended may be engagable with the pedal 50 of the vehicle. A user working on the vehicle involving the pedal 50 of the vehicle whether it is the gas pedal or the clutch pedal may do so alone and without the need of a helper. The user may bleed the brakes, conduct a diagnostic check of brake noise, conduct a check of the brake tail lights, and may perform hydraulic bleeding with the clutch pedal. The user may power on the linear actuator 18 using the power switch 40 on the remote control unit 38 from outside the vehicle and may extend the piston 22 from the elongated housing 19 and engage and depress the pedal 50 of the vehicle as desired using the forward and reverse switch 41. The user may control how far to depress the pedal 50 of the vehicle and may also retract the piston 22 and disengage with the pedal 50 of the vehicle when completed. In addition, the user may secure the at least one fastening member 28 to the anchor member 27 and the pedal 50 of the vehicle to draw the pedal back and towards the seat to conduct hydraulic bleeding using the clutch pedal. When finished, the user may release the brace 13 from the seat 48 and remove the electronic vehicle pedal activation system 10 from the passenger compartment 47.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the electronic vehicle pedal activation system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An electronic vehicle pedal activation system comprising; a support assembly including a shaft having a length and adapted to be removable and in contactable relationship with a floor board of a vehicle:
    a pedal activation assembly in communication with the support assembly for moving a pedal of a vehicle, wherein the pedal activation assembly includes at least one rigid support sleeve which is movably disposed upon, along and about the shaft, and also includes a linear actuator attached to the at least one support sleeve, and further includes a motor connected to the linear actuator for energizing thereof, wherein the linear actuator includes an elongated housing having an open end and side and end walls and also attached side-by-side to the at least one support sleeve with longitudinal axes of the elongated housing and the at least one support sleeve being parallel to one another, also includes a piston disposed in and extendable from the housing through the open end with the piston being parallel to the shaft and adapted to engage and depress the pedal of the vehicle; and
    a control assembly in operable communication with the pedal activation assembly.

2. The electronic vehicle pedal activation system as described in claim 1, wherein the piston has a distal end with a bore laterally disposed through the piston near the distal end, wherein the pedal activation assembly further includes an anchor member removably disposed through the bore of the piston.

3. The electronic vehicle pedal activation system as described in claim 2, wherein the anchor member is a bolt extending through the bore and outwardly of the piston.

4. The electronic vehicle pedal activation system as described in claim 2, wherein the pedal activation assembly also includes at least one fastening member removably secured to the anchor member and adapted to removably secure about and pull the pedal of the vehicle as the piston is retracted into the housing.

5. The electronic vehicle pedal activation system as described in claim 4, wherein the at least one fastening member is at least one strap removably disposed about the anchor member and adapted to removably secure about the pedal of the vehicle.

6. The electronic vehicle pedal activation system as described in claim 1, wherein the at least one support sleeve includes a first support sleeve and a second support sleeve attached side-by-side to the first support sleeve with the elongated housing also attached side-by side to the first support sleeve, wherein the first support sleeve is sandwiched between the second support sleeve and the elongated housing.

7. The electronic vehicle pedal activation system as described in claim 6, wherein the first and second support sleeves are interchangeably and movably disposed about and along the shaft to adapt to varying positions of the pedal of the vehicle relative to a pedal support.

8. An electronic vehicle pedal activation system comprising; a support assembly including a shaft having a length and adapted to be removable and in contactable relationship with a floor board of a vehicle;
    a pedal activation assembly in communication with the support assembly for moving a pedal of a vehicle, wherein the pedal activation assembly includes at least one rigid support sleeve which is movably disposed upon, along and about the shaft, and also includes a linear actuator attached to the at least one support sleeve, and further includes a motor connected to the linear actuator for energizing thereof; and
    a control assembly in operable communication with the pedal activation assembly, wherein the control assembly further includes speakers mounted to the pedal activation assembly and connected to the processor to emit selected distinct audible sounds depending upon whether the piston is being extended or retracted.

9. The electronic vehicle pedal activation system as described in claim 8, wherein the control assembly also includes a sensor removably disposed upon the piston near the distal end thereof and in communication with the processor to detect and transmit motion and position of the piston to the processor whereupon the distinct audible sounds are emitted through the speakers, and further includes at least one sensor activating member removably positioned upon the shaft to which the sensor senses and detects the position of the piston.

10. The electronic vehicle pedal activation system as described in claim 9, wherein the at least one sensor activating member is a clip with a chip removably positioned about and along the shaft and to which the sensor is capable of detecting.

* * * * *